US012517522B2

(12) United States Patent
La Civita

(10) Patent No.: US 12,517,522 B2
(45) Date of Patent: Jan. 6, 2026

(54) AIRCRAFT MASS ESTIMATION

(71) Applicant: THE BOEING COMPANY, Arlington, VA (US)

(72) Inventor: Marco La Civita, Madrid (ES)

(73) Assignee: THE BOEING COMPANY, Arlington, VA (US)

( * ) Notice: Subject to any disclaimer, the term of this patent is extended or adjusted under 35 U.S.C. 154(b) by 88 days.

(21) Appl. No.: 18/296,550

(22) Filed: Apr. 6, 2023

(65) Prior Publication Data

US 2023/0333571 A1    Oct. 19, 2023

(30) Foreign Application Priority Data

Apr. 14, 2022    (EP) .................................... 22382357

(51) Int. Cl.
*G05D 1/00*    (2024.01)
*G01G 19/414*    (2006.01)
*G08G 5/34*    (2025.01)

(52) U.S. Cl.
CPC .......... *G05D 1/101* (2013.01); *G01G 19/414* (2013.01); *G08G 5/34* (2025.01)

(58) Field of Classification Search
CPC .... G05D 1/101; G01G 19/414; G08G 5/0039; G08G 5/0034; G08G 5/0021; G08G 5/0043; G08G 5/0095; G08G 5/025
See application file for complete search history.

(56) References Cited

U.S. PATENT DOCUMENTS

| | | | |
|---|---|---|---|
| 7,272,491 B1 * | 9/2007 | Berard | G06Q 10/047 701/14 |
| 8,977,484 B1 | 3/2015 | La Civita | |
| 9,020,662 B2 | 4/2015 | Félix et al. | |
| 9,196,165 B2 | 11/2015 | Civita et al. | |
| 9,250,099 B2 | 2/2016 | Felix et al. | |

(Continued)

FOREIGN PATENT DOCUMENTS

WO    2009042405 A3    11/2010

OTHER PUBLICATIONS

Extended European Search Report for application No. 22382357.6 dated Oct. 21, 2022, pp. 1-8.

(Continued)

*Primary Examiner* — Dylan M Katz
(74) *Attorney, Agent, or Firm* — Moore IP Law

(57) ABSTRACT

A method of generating an estimated initial mass of an aircraft includes obtaining a first sequence of instructions indicating aircraft intent for a particular phase of a flight. The first sequence of instructions includes multiple sequential tabular instructions for a set of segments of the particular phase, and operation of the aircraft according to the first sequence of instructions would result in a particular altitude profile during the particular phase. The method includes determining, using a bounded optimization operation, a first estimated mass of the aircraft and a throttle law instruction that, together, result in the particular altitude profile over a group of the segments. The method includes generating a second sequence of instructions that replaces the tabular instructions for the group of the segments with the throttle law instruction. The method also includes determining the estimated initial mass at least partially based on the first estimated mass.

20 Claims, 7 Drawing Sheets

(56) References Cited

U.S. PATENT DOCUMENTS

| | | | |
|---|---|---|---|
| 10,157,549 | B2 | 12/2018 | D'Alto et al. |
| 2009/0112535 | A1* | 4/2009 | Phillips ................. G06Q 10/04 |
| | | | 703/2 |
| 2015/0338853 | A1* | 11/2015 | Casado Magaña .. G08G 5/0043 |
| | | | 701/5 |
| 2015/0348421 | A1 | 12/2015 | Kashi et al. |
| 2016/0371989 | A1 | 12/2016 | D'Alto et al. |
| 2019/0317489 | A1* | 10/2019 | Hansman ............. G08G 5/0034 |
| 2020/0020237 | A1* | 1/2020 | Grimald ................ G08G 5/006 |
| 2021/0183253 | A1 | 6/2021 | LaCivita et al. |

OTHER PUBLICATIONS

10th US-Europe Air Traffic Management R&D Seminar, Chicago, IL, Jun. 10-13, 2013, pp. 1-56.

Alligier, R. et al., "Ground-based Estimation of the Aircraft Mass, Adaptive vs. Least Squares Method," Conference Paper, Jun. 2013, pp. 1-11.

Chatterji, Gano Broto, "Fuel Burn Estimation Using Real Track Data," 11th Aiaa Atio Conference, AIAA Centennial of Navel Aviation Form, American Institute of Aeronautics and Astronautics, retrieved Mar. 13, 2025, http://mc.manuscriptcentral.com/aiaa-matio11, pp. 1-17.

Lee, Hak-Tae et al., "Closed-Form Takeoff Weight Estimation Model for Air Transportation Simulation," American Institute of Aeronautics and Astronautics, Sep. 2010, DOI: 10.2514/6.2010-9156, p. 1-13.

Oaks, Robert D. et al., "Prototype Implementation and Concept Validation of a 4-D Trajectory Fuel Burn Model Application," AIAA Guidance, Navigation and Control Conference, Toronto, Canada, Aug. 4, 2010, pp. 1-26.

* cited by examiner

AIRCRAFT MASS ESTIMATION

CROSS REFERENCE TO RELATED APPLICATIONS

The present application claims priority from European Patent Application No. EP22382357.6, filed on Apr. 14, 2022 with the Spanish Receiving Office of the European Patent Office and entitled "AIRCRAFT MASS ESTIMATION," which is incorporated herein by reference in its entirety.

FIELD OF THE DISCLOSURE

The present disclosure is related to estimating the initial mass of an aircraft based on a flight trajectory.

BACKGROUND

Trajectory prediction is a core function of systems such as air traffic management (ATM) automation systems. Conventional advanced ATM applications, such as arrival management or conflict detection and resolution, use a ground-based automation function based on accurate and robust trajectory prediction to support air traffic controllers' decision-making processes. Uncertainty in the input data, such as the wind and temperature forecast, the initial aircraft mass, or the aircraft intent, limits the accuracy of conventional ground-based trajectory predictors. Typically, aircraft mass is not available to ATM systems, and only limited intent information, such as route and cruise speed information from an aircraft's flight plan, is available to ATM systems. Therefore, ground-based trajectory predictors make assumptions about the initial aircraft mass and the intended airspeed using heuristics based on the aircraft type, the intended route, the applicable airspace constraints, and historical data.

One of the main challenges for accurately analyzing the efficiency and environmental impact of current air traffic operations is the availability of fuel burn data. Fuel burn data is typically measured onboard each aircraft and stored in the flight data recorder of the aircraft. Given a specific traffic scenario of interest, such as the set of flights arriving at and departing from a given airport during a year, it would be prohibitively burdensome to gather the required fuel burn data from each airline operating at that airport and then format and organize the fuel burn data in a manner that facilitates the analysis. Although the fuel burn data of an aircraft can be estimated based on the aircraft's mass and trajectory, such estimates are limited by constraints such as the unavailability of the initial aircraft mass.

The ability to generate a more accurate estimate of an initial mass of an aircraft using commonly available data, therefore, would enable improved accuracy of ground-based trajectory predictors and thus improved operation of ATM systems that use such ground-based trajectory predictors, without causing significant disruption to existing systems or incurring prohibitive costs. More accurate estimates of initial aircraft mass would also enable improved accuracy when analyzing efficiency and environmental impacts of air traffic operations.

SUMMARY

According to an implementation of the present disclosure, a method of generating an estimated initial mass of an aircraft includes obtaining, by one or more processors, a first sequence of instructions indicating aircraft intent for a particular phase of a flight of the aircraft. The first sequence of instructions includes multiple sequential tabular instructions for a set of segments of the particular phase, the particular phase corresponds to one of a climb phase or a descent phase, and operation of the aircraft according to the first sequence of instructions would result in a particular altitude profile of the aircraft during the particular phase. The method includes determining, by the one or more processors using a bounded optimization operation, a first estimated mass of the aircraft and a throttle law instruction that, together, result in the particular altitude profile over a group of the segments. The method includes generating, by the one or more processors, a second sequence of instructions that replaces, for the group of the segments, the tabular instructions for the group of the segments with the throttle law instruction. The method also includes determining, by the one or more processors, the estimated initial mass of the aircraft at least partially based on the first estimated mass.

According to another implementation of the present disclosure, a system for generating an estimated initial mass of an aircraft includes a memory configured to store data associated with a flight of the aircraft. The system also includes one or more processors configured to obtain a first sequence of instructions indicating aircraft intent for a particular phase of the flight. The first sequence of instructions includes multiple sequential tabular instructions for a set of segments of the particular phase, the particular phase corresponds to one of a climb phase or a descent phase, and operation of the aircraft according to the first sequence of instructions would result in a particular altitude profile of the aircraft during the particular phase. The one or more processors are configured to determine, using a bounded optimization operation, a first estimated mass of the aircraft and a throttle law instruction that, together, result in the particular altitude profile over a group of the segments. The one or more processors are configured to generate a second sequence of instructions that replaces, for the group of the segments, the tabular instructions for the group of the segments with the throttle law instruction. The one or more processors are also configured to determine the estimated initial mass of the aircraft at least partially based on the first estimated mass.

According to another implementation of the present disclosure, a non-transitory, computer-readable medium stores instructions that, when executed by a processor, cause the processor to initiate, perform, or control operations for generating an estimated initial mass of an aircraft. The operations include obtaining a first sequence of instructions indicating aircraft intent for a particular phase of a flight of the aircraft. The first sequence of instructions includes multiple sequential tabular instructions for a set of segments of the particular phase, the particular phase corresponds to one of a climb phase or a descent phase, and operation of the aircraft according to the first sequence of instructions would result in a particular altitude profile of the aircraft during the particular phase. The operations include determining, using a bounded optimization operation, a first estimated mass of the aircraft and a throttle law instruction that, together, result in the particular altitude profile over a group of the segments. The operations include generating a second sequence of instructions that replaces, for the group of the segments, the tabular instructions for the group of the segments with the throttle law instruction. The operations also include determining, by the one or more processors, the estimated initial mass of the aircraft at least partially based on the first estimated mass.

The features, functions, and advantages described herein can be achieved independently in various implementations or may be combined in yet other implementations, further details of which can be found with reference to the following description and drawings.

DETAILED DESCRIPTION

Figure 1:
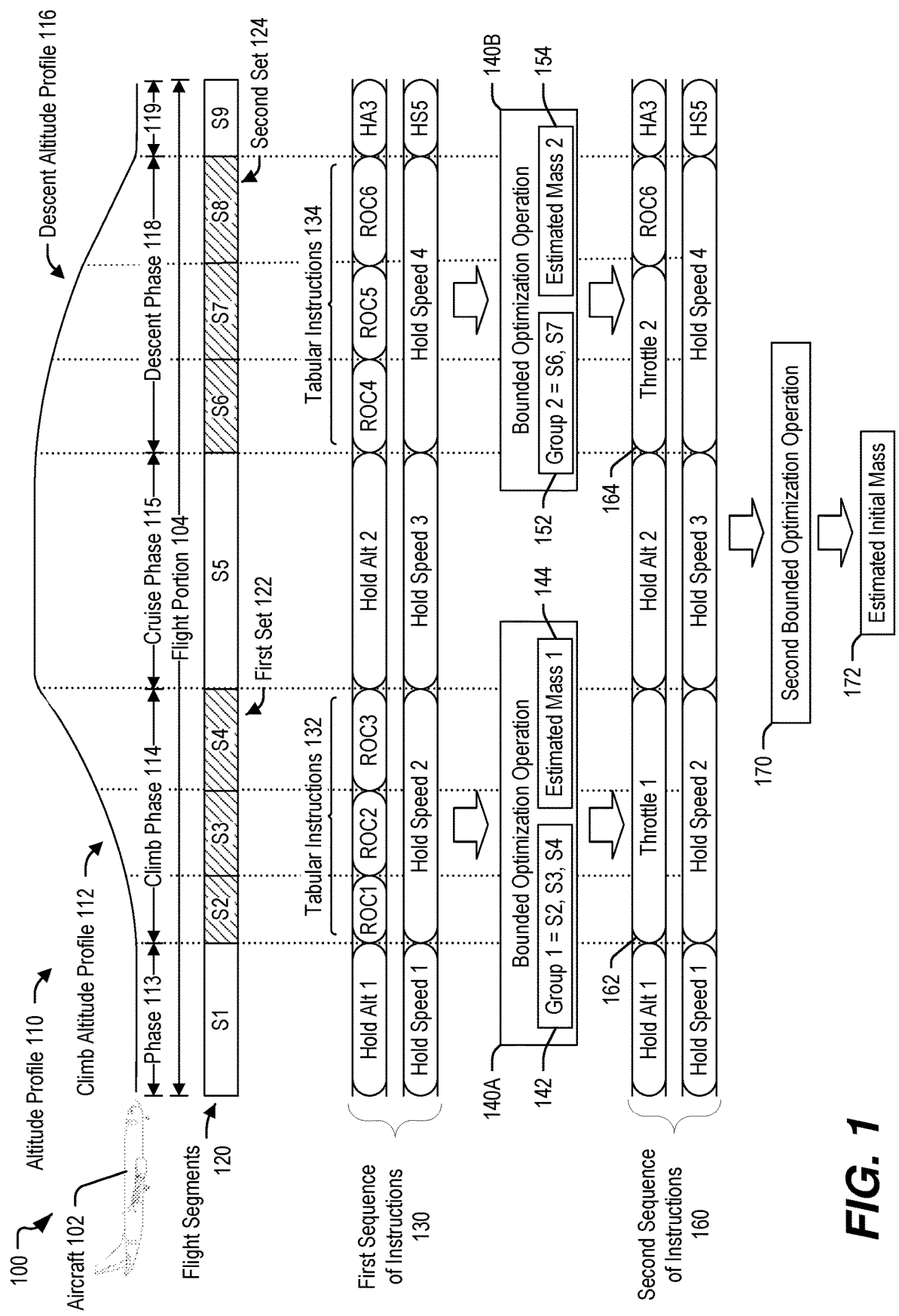
FIG. 1 is a diagram that illustrates an altitude profile of a flight of an aircraft and various operations associated with determining an estimated initial mass of the aircraft based on the trajectory of the aircraft during phases of the flight.

Techniques described herein enable improved estimation of aircraft mass that can be based on, for example, a sequence of recorded positions of a flight of the aircraft. Conventionally, the accuracy of predicting the trajectory of an aircraft, and therefore of ATM systems that use trajectory prediction, is dependent on the accuracy of estimating the initial mass of the aircraft. In addition, analyzing the efficiency and the environmental impact of air traffic operations is also dependent on the accuracy of initial mass estimates of affected aircraft, at least with respect to generating estimates of fuel burn data to support such analysis. The improved estimation of initial aircraft mass disclosed herein enables improvements in operation of various air traffic systems, such as ATM systems, as well as systems that analyze aspects associated with air traffic, such as noise generation and efficiency and environmental impact associated with fuel burn, as illustrative, non-limiting examples.

Although obtaining and integrating aircraft initial mass data for a large number of flights from multiple airlines may be prohibitively burdensome, it is feasible to obtain recorded surveillance tracks (e.g., time-stamped aircraft positions derived from radar or from Automatic Dependent Surveillance-Broadcast (ADS-B) reporting) for the flights of interest from the air navigation service provider responsible for the airport, and the data for all such flights would typically be in the same format. Thus, the ability to estimate initial aircraft mass and infer fuel burn from recorded tracks, made possible by the disclosed techniques, facilitates the accurate assessment of the efficiency and environmental impact of current air traffic operations. This in turn enables the establishment of a baseline against which to compare the results of simulations measuring the effects of the introduction of new procedures, operational concepts, changes in the fleet mix, etc.

According to an aspect, a system processes inputs associated with a flight of an aircraft, such as trajectory data, an aircraft performance model corresponding to the aircraft type, and a model of the atmosphere (e.g., including wind direction, wind speed, and temperature) along the aircraft trajectory. The system infers instances of aircraft intent, represented as a sequence of instructions that fit the trajectory data and filters out noise present in the original data. In an example, the instructions correspond to instructions of an aircraft intent description language (AIDL) and may be expressed in a set of instruction "threads," such as three threads representing motion of the aircraft and three threads representing aircraft configuration (e.g., landing gear, high-lift devices, and speed brakes). In an illustrative example, the threads representing the motion can include a first thread that contains constant, linear, and tabular speed instructions, a second thread that contains constant, linear, and tabular altitude instructions, and a third thread that contains lateral path information, such as a combination of geodesics, circular arcs, and constant bearing flight segments, if present.

According to an aspect, the system identifies a segment of the flight corresponding to an ascent or descent phase and computes an upper bound and a lower bound for an estimated mass of the aircraft. In a general case, these bounds could be the maximum take-off weight (mass) and operating empty weight (mass), respectively, for the aircraft. In some examples, the range between the upper bound and the lower bound is reduced if the recorded trajectory of the aircraft starts from the ground, ends at the ground, or both. To illustrate, since aircraft mass varies over the flight due to fuel burn, the lower bound at takeoff can be based on the operating empty weight and increased by fuel used for the flight and a designated fuel reserve, and the upper bound at landing can be based on the maximum take-off weight reduced by an estimated mass of the fuel consumed during the flight.

According to an aspect, the system attempts to replace as many of the tabular instructions of the current segment of the flight with instructions corresponding to an operational intent. To illustrate, the system uses a bounded optimization technique to substitute tabular altitude instructions, speed instructions, or both, with a combination of a mass and a throttle instruction whose resulting altitude profile fits the actual altitude profile of the current segment of the flight.

According to an aspect, after replacing tabular instructions over multiple flight segments, the system processes the combined flight segments in another bounded optimization problem to arrive at an estimated initial mass of the aircraft.

Thus, the system uses techniques that are applicable to any type of trajectory and any type of aircraft to generate more accurate mass estimates than are attainable using conventional techniques. Such improved mass estimates enable improved trajectory prediction and fuel burn, which in turn improve operation of ATM systems as well as systems that analyze aspects associated with air traffic, such as noise generation and efficiency and environmental impact associated with fuel burn, as illustrative, non-limiting examples.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple instances of a bounded optimization operation 140 are illustrated and associated with reference numbers 140A and 140B. When referring to a particular one of these bounded optimization operations, such as a bounded optimization operation 140A, the distinguishing letter "A" is used. However, when referring to any arbitrary one of these bounded optimization operations or these bounded optimization operations as a group, the reference number 140 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "group" or "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 includes a diagram 100 illustrating an altitude profile 110 of an aircraft 102 during a portion 104 of a flight, a first sequence 130 of instructions, and a second sequence 160 of instructions. According to an aspect, the altitude profile 110 represents altitude data from recorded position data of a flight of the aircraft 102. To illustrate, the recorded position data can correspond to a time series of three-dimensional positions of the aircraft 102, such as captured by radar. Each of the first sequence 130 of instructions and the second sequence 160 of instructions describes a time series of intent instances (e.g., instructions that define aspects of motion and configuration of the aircraft 102 indicating how the aircraft 102 is to be flown) that, when used to operate the aircraft 102, would cause a resulting trajectory of the aircraft 102 to have an altitude profile that matches the altitude profile 110. The second sequence 160 of instructions is generated by replacing, for a climb phase 114, a descent phase 118, or both, sequential tabular instructions in the first sequence 130 of instructions with one or more throttle instructions, as explained further below. An estimated initial mass 172 of the aircraft 102 represents the mass of the aircraft 102 at the beginning of the portion 104 of the flight and has a value that is determined, via an optimization process, to provide a best fit between the altitude profile 110 and the altitude profile that results from operating the aircraft 102 according to the second sequence 160.

The portion 104 of the flight is logically divided into segments 120. In a particular implementation, the boundaries of each of the segments 120 are selected based on detecting periods of substantially constant altitude, substantially linear increase or decrease in altitude (e.g., substantially constant rate of climb), substantially constant speed (e.g., mach or calibrated air speed (CAS)), substantially linear increase or decrease in speed, or combinations thereof. As used herein, a time series of values, such as a time series of altitude values or speed values, is "substantially linear" when a metric indicating how much the values deviate from a best-fitting straight line (e.g., as determined via linear regression) satisfies (e.g., is less than) a threshold amount. As used herein, a time series of values (e.g., a time series of altitude values or speed values) are "substantially constant" when a metric, indicative of how much the values deviate from a best-fitting straight line that is constrained to have zero slope, satisfies a threshold amount. In an illustrative, non-limiting example, a line of best fit can be determined using a least squares method, and the metric can correspond to a root-mean-square error. The threshold amount can depend on one or more factors such as the aircraft type, altitude, flight portion, etc., and can be determined, for example, based on actual flight data of one or more aircraft that are controlled to have a particular behavior (e.g., constant speed, constant altitude, constant rate of climb, or constant acceleration), based on one or more models or other calculations, or any combination thereof.

In a particular aspect, the first sequence 130 of instructions indicates aircraft intent for each particular phase of a flight of the aircraft 102. A first segment S1 corresponds to a phase 113 of the flight during which the aircraft 102 has a constant altitude and speed, which is represented in the first sequence 130 as a first "hold altitude" instruction (Hold Alt 1) and a first "hold speed" instruction (Hold Speed 1).

The climb phase 114 spans a first set 122 of segments including a second segment S2, a third segment S3, and a fourth segment S4. The aircraft 102 maintains a constant speed during the first set 122 of segments, represented in the first sequence 130 as a second "hold speed" instruction (Hold Speed 2). The aircraft 102 also increases altitude according to a parabolic or other non-linear climb trajectory that is approximated, in a piecewise linear manner, as a first constant rate of climb during the second segment S2, a second constant rate of climb, greater than the first rate of climb, during the third segment S3, and a third constant rate of climb, greater than the second rate of climb, during the fourth segment S4. The first sequence 130 of instructions includes multiple sequential tabular instructions 132 for the first set 122 of segments 120, including a first "constant rate of climb" instruction (ROC1) for the second segment S2, a second "constant rate of climb" instruction (ROC2) for the third segment S3, and a third "constant rate of climb" instruction (ROC3) for the fourth segment S4. According to an aspect, the boundaries of each of the segments S2-S4 are determined based on how long the climb altitude profile 112 during that segment remains substantially linear.

Following the climb phase 114, the aircraft 102 maintains a constant altitude and speed during a cruise phase 115 that spans a fifth segment S5 of the flight, represented in the first sequence 130 as a second "hold altitude" instruction (Hold Alt 2) and a third "hold speed" instruction (Hold Speed 3).

The descent phase 118 spans a second set 124 of segments including a sixth segment S6, a seventh segment S7, and an eighth segment S8. The aircraft 102 maintains a constant speed during the second set 124 of segments, represented in the first sequence 130 as a fourth "hold speed" instruction (Hold Speed 4). The aircraft 102 decreases altitude according to a parabolic or other non-linear descent trajectory that is approximated, in a piecewise linear manner, as a fourth constant rate of climb during the sixth segment S6, a fifth constant rate of climb, different than the fourth rate of climb, during the fifth segment S5, and a sixth constant rate of climb, different than the fifth rate of climb, during the sixth segment S6. (In this example, a rate of descent is referred to as a negative rate of climb.) The first sequence 130 of instructions includes multiple sequential tabular instructions 134 for the second set 124 of segments 120, including a fourth "constant rate of climb" instruction (ROC4) for the sixth segment S4, a fifth "constant rate of climb" instruction (ROC5) for the seventh segment S7, and a sixth "constant rate of climb" instruction (ROC6) for the eight segment S8. According to an aspect, the boundaries of each of the segments S6-S8 are determined based on how long the descent altitude profile 116 during that segment remains substantially linear.

Following the descent phase 118, the aircraft 102 maintains a constant altitude and speed during a phase 119 that spans a ninth segment S9 of the flight, represented in the first sequence 130 as a third "hold altitude" instruction (HA3) and a fifth "hold speed" instruction (HS5).

Thus, the first sequence 130 of instructions is generated such that operation of the aircraft 102 according to the first sequence 130 of instructions would result in the altitude profile 110, including the climb altitude profile 112 during the climb phase 114 and the descent altitude profile 116 of the aircraft 102 during the descent phase 118. It should be understood that the first sequence 130 of instructions (and the second sequence 160 of instructions), as well as the altitude profile 110, are simplified for clarity of illustration and explanation. In other implementations, additional instructions may be included to represent transitions between phases (e.g., leveling off following the climb phase 114 or the descent phase 118), additional segments and instructions may be included to represent other variations in speed during one or more phases of the flight, etc. Further, the first sequence 130 (and the second sequence 160) of instructions may be extended to incorporate directional instructions, such as instructions for lateral directional control (e.g., bank angles) and directional guidance (e.g., hold course), and aircraft configuration instructions, such as for high-lift devices, speed brakes, and landing gear. In an illustrative example, the instructions correspond to intent instances of an aircraft intent description language (AIDL).

A bounded optimization operation 140A is used to determine a first estimated mass 144 of the aircraft 102 and a throttle law instruction 162 that, together, result in the climb altitude profile 112 over a group 142 of the segments 120. To illustrate, rather than the operator of the aircraft 102 designating multiple linear rates of climb via the sequence of tabular instructions 132 to approximate a parabolic climb, it is more likely that the operator selects a throttle setting (e.g., a maximum climb throttle value) that, in conjunction with the second "hold speed" instruction, results in the parabolic climb altitude profile 112. The bounded optimization operation 140A can include iteratively varying values of the first estimated mass 144 and the throttle law instruction 162 to identify a combination that duplicates the climb altitude profile 112, within a designated accuracy, over a largest number of segments of the climb phase 114. As illustrated, the bounded optimization operation 140A identifies the throttle law instruction 162 and the first estimated mass 144 that duplicate the climb altitude profile 112 over segments S2-S4 (e.g., the group 142 spans the entire climb phase 114). The resulting throttle law instruction 162 (Throttle 1) is used in the second sequence 160 of instructions to replace the tabular instructions 132 for the first group 142 of the segments 120.

Similarly, a bounded optimization operation 140B is used to determine a second throttle law instruction 164 (Throttle 2) and a second estimated mass 154 of the aircraft 102 that describe the descent altitude profile 116 over a second group 152 of the segments 120. As illustrated, the second throttle law instruction 164 (e.g., a minimum throttle setting), together with the second estimated mass 154 and the fourth "hold speed" instruction, produces the descent altitude profile 116 over the segments S6 and S7, but the lengthened linear descent during segment S8 results in no throttle law/estimated mass combination being able to reproduce the entire descent altitude profile 116 within a designated accuracy. The second throttle law instruction 164 is used in the second sequence 160 of instructions to replace the tabular instructions 134 for the second group 152 of the segments 120 (e.g., replacing the ROC instructions for segments S6 and S7 but not S8).

The estimated initial mass 172 is determined based on a second bounded optimization operation 170 that uses the second sequence 160 of instructions, including the throttle law instruction 162 and the second throttle law instruction 164, to determine a value of the estimated initial mass 172 that results in a predicted trajectory having an altitude profile that most closely matches the altitude profile 110 of the flight. In an example, the first estimated mass 144 indicates an estimate of the mass of the aircraft 102 at the beginning of the climb phase 114, and the second estimated mass 154 represents an estimate of the mass of the aircraft 102 at the beginning of the descent phase 118, which is expected to be less than first estimated mass 144 at least due to the fuel consumed during the climb phase 114 and the cruise phase 115. According to an aspect, the second bounded optimization operation 170 uses the first estimated mass 144 and the second estimated mass 154 to determine one or more initial values of the estimated initial mass 172 and iteratively varies the estimated initial mass 172 until finding a value that provides a best fit to the altitude profile 110 over the entire portion 104 of the flight. An example that provides additional details regarding the bounded optimization operation 140 and the second bounded optimization operation 170 is described with reference to FIG. 5.

By converting sequences of tabular instructions (e.g., sequences of the tabular instructions 132 or 134) describing the climb phase 114, the descent phase 118, or both, into throttle instructions that, together with an estimated mass (e.g., the estimated mass 144 or 154), result in the respective climb altitude profile 112, descent altitude profile 116, or both, the estimated initial mass 172 of the aircraft 102 and the second sequence 160 that identifies the altitude profile 110 are obtained. The estimated initial mass 172 provides higher accuracy than heuristics or other common techniques for estimating the mass of the aircraft 102. The increased accuracy of the estimated initial mass 172 enables more accurate trajectory predictions of the aircraft 102, such as by an air traffic automation system using real-time aircraft position data as described further with reference to FIG. 3, more accurate determination of fuel consumption history, efficiency, environmental impact, or noise generation of the aircraft 102 as described further with reference to FIG. 4, or a combination thereof.

Although FIG. 1 depicts a single portion 104 of the flight that includes a single climb phase 114 and a single descent phase 118, in other implementations the described techniques can be used to describe an entire flight of the aircraft 102 and may include any number of phases, such as including any number of climb phases, any number of descent phases, or both. An instance of the bounded optimization operation 140 (e.g., the bounded optimization operation 140A) may be applied to each climb phase and to each descent phase to obtain estimated masses and corresponding throttle law instructions to be substituted into the second sequence 160 of instructions.

As explained above, although nine segments 120 are illustrated, in other implementations, a much larger number of segments may be determined based on detecting regions of constant altitude, constant rate of climb (or descent), constant speed, or linear change of speed (e.g., constant acceleration), as well as based on changes in lateral bearing or bank angle, high-lift device configuration, landing gear configuration, speed brakes configuration, or any combination thereof.

Although the first estimated mass 144, the second estimated mass 154, and the estimated initial mass 172 are described as estimates of mass (e.g., combined mass of the aircraft 102, passengers or cargo, and fuel), it should be understood that one or more (or all) such estimates may alternatively be estimates of weight rather than mass. The terms "mass" (e.g., in kilograms (kg)) and "weight" (e.g., in Newtons (N)) are to be considered interchangeable in the present disclosure, and conversions between mass and weight (e.g., via multiplication or division by gravitational acceleration), are well-known to those skilled in the art.

Figure 2:
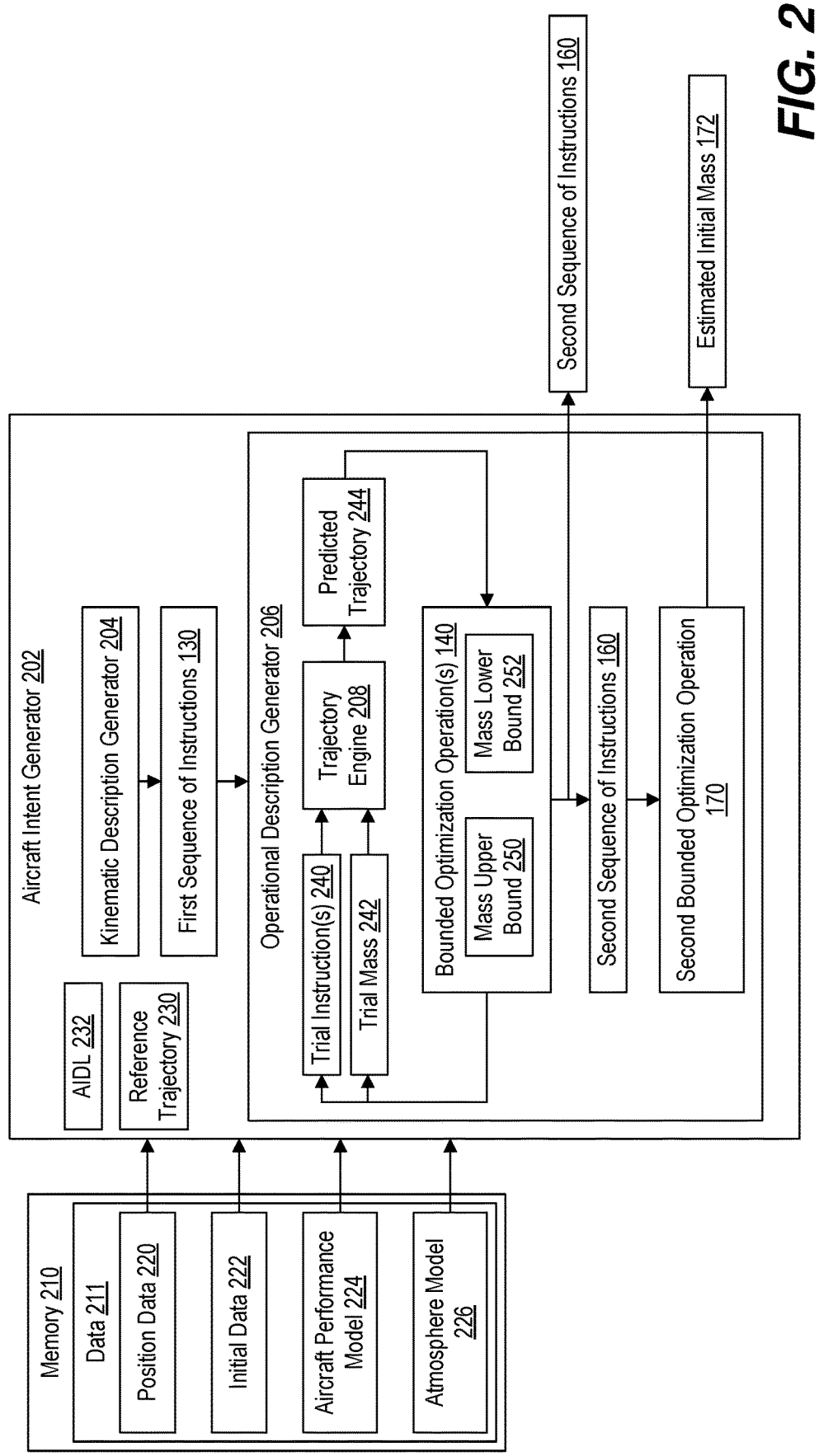
FIG. 2 is a block diagram of a system including an aircraft intent generator that may perform the operations of FIG. 1 to determine an estimated initial mass of an aircraft.

FIG. 2 depicts a system 200 that is configured to generate the first sequence 130 of instructions, to perform the bounded optimization operation 140 to generate the second sequence 160 of instructions, and to perform the second bounded optimization operation 170 to generate the estimated initial mass 172. The system 200 includes an aircraft intent generator 202 coupled to a memory 210.

The memory 210 is configured to store data 211 corresponding to a flight of the aircraft 102. In a particular implementation, the data 211 includes position data 220, such as a time series of three dimensional data representing a recorded track of a flight of the aircraft 102. In some implementations, the position data 220 corresponds to recorded position data that is obtained, for example, via radar tracking or ADS-B reporting, while in other implementations the position data 220 may be generated via one or more simulations or models. The data 211 also includes initial data 222, an aircraft performance model 224, and atmosphere model 226.

In a particular implementation, the initial data 222 includes data corresponding to operational strategies governing the aircraft, such as the preferences of an airline with respect to loads (both payload and fuel), how to react to meteorological conditions such as temperature, wind speeds, altitude, jet stream, thunderstorms, and turbulence, cost structure (e.g., such as minimizing time of flight or minimizing cost of flight), maintenance costs, environmental impact, communication capabilities, passenger comfort requirements, and security considerations. In some implementations, the initial data 222 includes constraints on use of airspace, such as constraints imposed by the air traffic control to all flights operating within the given airspace, which may include speed constraints, altitude restrictions, etc. According to an aspect, the initial data 222 (or the aircraft performance model 224, or both) includes data associated with the aircraft 102, such as maximum takeoff weight, operating empty weight, etc., data associated with the particular flight, such as a flight plan, or a combination thereof.

In a particular implementation, the aircraft performance model 224 includes values of aircraft performance aspects that are usable by the aircraft intent generator 202 to integrate equations of motion associated with flight of the aircraft 102. These values can depend on the aircraft type for which a trajectory is to be computed, the aircraft's current motion state (e.g., position, velocity, weight, etc.) and the current local atmospheric conditions. In addition, the performance values may depend on an intended operation of the aircraft. In an example, the aircraft intent generator 202 can use the aircraft performance model 224 to provide a value of the instantaneous rate of descent corresponding to a certain aircraft weight, atmospheric conditions (e.g., pressure altitude and temperature) and intended speed schedule (e.g. constant calibrated airspeed). The aircraft performance model 224 can also include values of applicable constraints so as to ensure that the aircraft motion remains within a designated flight envelope. According to an aspect, the aircraft performance model 224 includes other performance-related data, such as flap and landing gear deployment times.

The aircraft intent generator 202 includes a kinematic description generator 204 and an operational description generator 206. The kinematic description generator 204 is configured to obtain the position data 220 (e.g., recorded position data) corresponding to at least a portion 104 of the flight. The kinematic description generator 204 is configured to generate the first sequence 130 of instructions based on the recorded position data 220 by selecting instructions that would cause a trajectory of the aircraft 102, when operated according to the first sequence 130 of instructions, to match a reference trajectory 230 (e.g., a trajectory that is generated based on the position data 220).

In an example, the kinematic description generator 204 is configured to perform segmentation of the position data 220 based on a linear regression with binary search technique. To illustrate, the kinematic description generator 204 can receive the position data 220 to be segmented, an upper RMS error limit, and the order of the linear regression model to be used. The kinematic description generator 204 can perform an initial fit with all of the position data 220 using a linear regression model of the designated order. If the fit is within the error bounds (e.g., the RMS error of the fit is less than the upper RMS error limit), a single segment is used for all of the position data 220.

Otherwise, a binary search is started that uses a function "f" to find the longest segment length that fits the initial part of the position data 220. In a particular implementation, for a range of position data under consideration:

$f=\min(f1, f2),$ $f1 = k*\text{max\_RMS\_error} - \text{abs}(\text{fit\_error\_at\_segment\_end})$, and $f2 = \text{max\_RMS\_error} - \text{fit\_RMS\_error},$ where min (A, B) is a function that returns the lesser of A and B, "k" is a parameter (e.g., a user-selected value, such as 3), "max_RMS_error" is the upper RMS error limit, abs( ) is an absolute value function, "fit_error_at_segment_end" represents how closely the linear regression model fits at the end of the segment, and "fit_RMS_error" represents how closely the linear regression model fits over the range under consideration. The function f is positive when f1 and f2 are both positive, and is negative when either f1 or f2 is negative. As the length of a segment is increased, the point at which the function f changes from positive to negative identifies the longest segment that can be covered by a single linear regression model of the given order satisfying the fit error bounds f1 and f2.

In a particular implementation, the binary search is a dichotomic divide-and-conquer search to locate the position of the point in the data where the function f changes sign. For a given iteration of the binary search over a particular data index range (e.g., a portion of the position data 220), the binary search includes: (a) halving the data index range, (b) recomputing a fit for the left part of the range, (c) computing the value of the function f for the new fit, (d) selecting the successive range to halve based on the value of f, where the left range is selected if f is negative, and the right range is selected if f is positive, and (e) repeating the process from (a) until the remaining range cannot be halved anymore (e.g., when the remaining range is a single point in the position data 220). The resulting point in the data where f changes sign corresponds to a segment boundary. Once the parameters of the linear regression model have been identified (e.g., the longest segment of the initial portion of the position data 220 that can be fit within the upper RMS error limit has been determined), processing repeats on the remaining portion of the position data 220 that has not yet been fitted, and continues until all of the position data 220 has been fit.

The above technique, one or more other techniques, or a combination thereof, can be performed by the kinematic description generator 204 on the position data 220 to identify segments of substantially linear behavior with respect to altitude, speed, or both. The kinematic description generator 204 can apply a model, lookup table, or other mapping to assign instructions to each of the resulting segments 120 to generate the first sequence 130 of instructions.

The operational description generator 206 is configured to process the first sequence 130 of instructions to generate the second sequence 160 of instructions and the estimated initial mass 172. According to an aspect, the first sequence 130 of instructions, the second sequence 160 of instructions, or both, include or consist of intent instances of an aircraft intent description language (AIDL) 232. To illustrate, the operational description generator 206 is configured to obtain the aircraft performance model 224 associated with the aircraft 102 including aircraft-specific details that influence aircraft response, such as aerodynamic and propulsive characteristics, preferred and default flap schedules, and other maneuvers, operational limitations, etc.

The operational description generator 206 is also configured to obtain the atmosphere model 226 corresponding to a volume of atmosphere where the flight takes place. To illustrate, the atmosphere model 226 can include data regarding the atmospheric conditions along the reference trajectory 230. For example, the position data 220 or the reference trajectory 230 can be used to retrieve the atmospheric conditions pertaining to that trajectory (e.g., a sequence of specified positions of the aircraft 102 at specified times) from a database of atmospheric conditions covering the general region of the airspace through which the aircraft 102 passed.

The operational description generator 206 is configured to perform an instance of the bounded optimization operation 140 for each particular climb phase or descent phase of the flight. To illustrate, the operational description generator 206 obtains a mass upper bound 250 and a mass lower bound 252 of the aircraft 102 that are used as constraints by the bounded optimization operation 140 for the particular phase (e.g., the climb phase 114 or the descent phase 118). In some examples, the mass upper bound 250 is set based on the maximum takeoff weight of the aircraft 102, and the mass lower bound 252 is set based on the operating empty weight of the aircraft 102, or the empty weight of the aircraft 102 plus the mass of a fuel reserve (e.g., per a fuel reserve policy that may be specified in the initial data 222, such as a 10% fuel reserve). In some implementations, the mass upper bound 250, the mass lower bound 252, or both, may be further refined based on the particular phase of the flight, such as by lowering the mass upper bound 250 based on estimated fuel consumption prior to the particular phase.

The operational description generator 206 includes a trajectory engine 208 that is configured to receive one or more of an intent instruction, an aircraft mass, or both, and generate a resulting trajectory. For example, during the bounded optimization operation 140, one or more trial instructions 240 (e.g., the throttle law instruction 162) and a trial mass 242 are input to the trajectory engine 208. The trajectory engine 208, in conjunction with the aircraft performance model 224 and the atmosphere model 226, generates a predicted trajectory 244. The predicted trajectory 244 is compared to the reference trajectory 230, and the trial instruction(s) 240, the trial mass 242, or both, may then be updated for a next iteration of generating a predicted trajectory 244. This process can be iteratively performed (e.g., using a binary search to select values of the trial mass 242 based on how closely predicted trajectories using previous values of the trial mass matched the reference trajectory 230) until the bounded optimization operation 140 terminates, such as when an estimated mass and throttle law instruction is determined that causes the predicted trajectory 244 to match the reference trajectory 230 within a threshold amount.

After completing an instance of the bounded optimization operation 140 for each of the climb phases and descent phases of the flight, the operational description generator 206 determines the estimated initial mass 172 based on the second bounded optimization operation 170 using the second sequence 160 of instructions (e.g., including the throttle law instruction 162 and the second throttle law instruction 164), processed at the trajectory engine 208, to determine a value of the estimated initial mass 172 that results in a predicted trajectory 244 that most closely matches the reference trajectory 230 of the flight.

In some implementations, the memory 210 can correspond to one or more volatile memory devices (e.g., random access memory (RAM) devices), one or more nonvolatile memory devices (e.g., read-only memory (ROM) devices, programmable read-only memory, and flash memory), or a combination thereof. The aircraft intent generator 202 can be implemented via one or more processors (e.g., using a single processing core or multiple processing cores, on a single processor chip or multiple processors chips, in direct communication with each other or in a distributed processing system) executing computer instructions, dedicated hardware, or a combination thereof. Although various operations are described as being performed iteratively, in some implementations such operations may be executed fully or partially in parallel rather than in sequential iterations. For example, the operational description generator 206 may include multiple instances of the trajectory engine 208 configured to operate in parallel on different values of the trial mass 242 to generate multiple predicted trajectories 244 concurrently. Although a binary search technique is provided as an example for selecting a trial mass for a next iteration of an optimization operation, in other implementations one or more other techniques may be used, such as a brute-force technique or a gradient descent technique, as illustrative, non-limiting examples.

Figure 3:
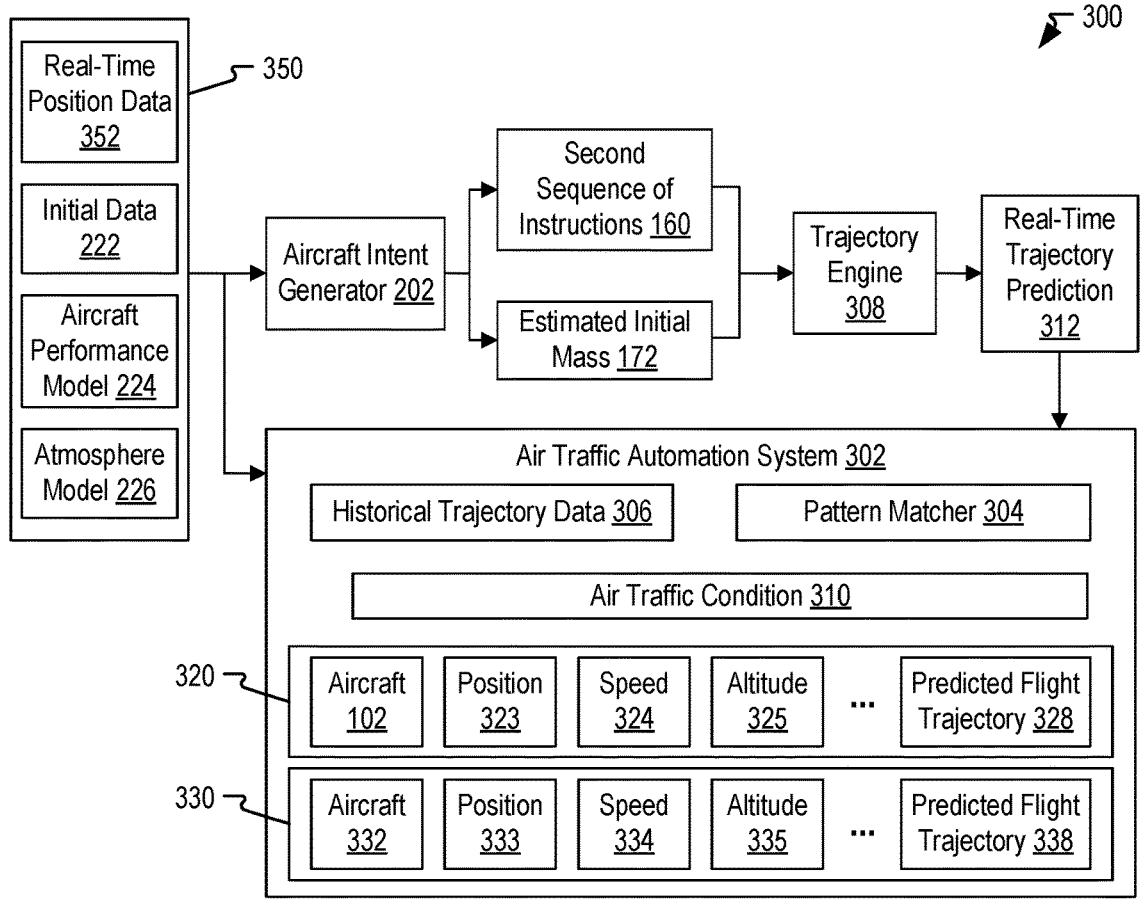
FIG. 3 is a block diagram of a system that includes the aircraft intent generator of FIG. 2 and an air traffic automation system that uses a real-time trajectory prediction based on the estimated initial mass.

FIG. 3 depicts a system 300 that includes the aircraft intent generator 202 of FIG. 2, a trajectory engine 308, and an air traffic automation system 302. The system 300 is configured to adjust at least one of the flight of the aircraft 102 or a flight of another aircraft 332 responsive to an update, by the air traffic automation system 302, of an air traffic condition 310 based on a real-time trajectory prediction 312.

Data 350 corresponding to a flight of the aircraft 102 includes real-time position data 352 that includes a time series of spatial positions of the aircraft 102 recorded while the aircraft 102 is in flight, such as via radar tracking in a vicinity of an airport or other controlled air space. The data 350 also includes the initial data 222, the aircraft performance model 224, and the atmosphere model 226. The data 350 is accessible to (e.g., provided to or retrievable by) the aircraft intent generator 202, the trajectory engine 308, and the air traffic automation system 302.

The aircraft intent generator 202 generates the second sequence 160 of instructions and the estimated initial mass 172 as described in FIG. 2, using the real-time position data 352 as the position data 220. The trajectory engine 308 operates substantially as described for the trajectory engine 208 and processes the second sequence 160 of instructions and the estimated initial mass 172 generated by the aircraft intent generator 202 to generate a real-time trajectory prediction 312, which is provided to the air traffic automation system 302. Although illustrated as distinct from the aircraft intent generator 202, in another particular implementation, the trajectory engine 308 is included in the aircraft intent generator 202 (e.g., the trajectory engine 208).

The air traffic automation system 302 is configured to track the air traffic condition 310, which may include positions and other information related to aircraft in a particular region, predicted flight trajectories of each of the aircraft, and predicted future spatial relationships between the aircraft based on the predicted flight trajectories. The air traffic automation system 302 includes a database or other data structure that includes data corresponding to tracked aircraft. For example, first data 320 corresponding to the aircraft 102 includes data corresponding to a position 323, speed 324, and altitude 325, in addition to other data (e.g., the aircraft type, mass, fuel on board, flight origin and destination, etc.) and a predicted flight trajectory 328 for the aircraft 102. Second data 330 corresponding to another aircraft 332 includes data corresponding to the position 333, speed 334, and altitude 335, in addition to other data (e.g., the aircraft type, mass, fuel on board, flight origin and destination, etc.) and a predicted flight trajectory 338 for the aircraft 332.

The air traffic automation system 302 includes a pattern matcher 304 that is configured to compare the real-time trajectory prediction 312 to historical trajectory data 306 to determine, or update, the predicted flight trajectory 328 for the aircraft 102. To illustrate, although the air traffic automation system 302 may receive a flight plan of the aircraft 102 as part of the initial data 222, there may be multiple specific flight variations that are used by the operator of the aircraft 102 that comply with the flight plan. For example, the operator of the aircraft 102 may select between the different variations based on weather conditions, based on the operator's objective for the particular flight (e.g., to reduce costs by increasing fuel efficiency, or to reduce a total flight time), based on one or more other factors, or a combination thereof. Such variations are captured in the historical trajectory data 306 and may be compared, by the pattern matcher 304 to the real-time trajectory prediction 312 to identify which particular variation the aircraft 102 is following. The identified variation can be used to update the predicted flight trajectory 328 for the aircraft 102.

Updating the predicted flight trajectory 328 affects the air traffic condition 310, which may be updated to indicate that, for example, a projected future distance between the aircraft 102 and the aircraft 332 may be smaller than a minimum distance criteria, causing the air traffic automation system 302 to issue instructions to one or both of the aircraft 102 or the aircraft 332 to ensure the distance criteria remains satisfied. Thus, at least one of the flight of the aircraft 102 or a flight of the other aircraft 332 can be adjusted responsive to an update, by the air traffic automation system 302, of the air traffic condition 310 based on the real-time trajectory prediction 312.

Figure 4:
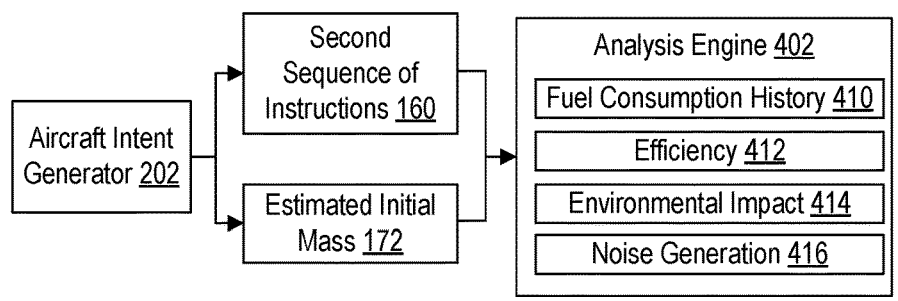
FIG. 4 is a block diagram of a system that includes the aircraft intent generator of FIG. 2 and an analysis engine that uses the estimated initial mass.

FIG. 4 depicts a system 400 that includes the aircraft intent generator 202 and an analysis engine 402. The aircraft intent generator 202 generates the second sequence 160 of instructions and the estimated initial mass 172 as described in FIG. 2, such as during an offline processing of recorded flight position data for a large number of flights. The analysis engine 402 performs processing based on the second sequence 160 of instructions and the estimated initial mass 172 for a particular flight of the aircraft 102 to generate an estimated fuel consumption history 410 of the flight at least partially based on the estimated initial mass 172. The analysis engine 402 is further configured to determine at least one of an efficiency 412 or an environmental impact 414 of the flight at least partially based on the estimated fuel consumption history 410. In some implementations, the analysis engine 402 is also configured to estimate an amount of noise generation 416 of the flight based on the estimated fuel consumption history 410. Analyzing the estimated fuel consumption history 410, efficiency 412, environmental impact 414, and/or noise generation 416 for a large number of flights can reveal modifications or best practices that can be implemented to reduce fuel costs, improve efficiency, reduce environmental impact, reduce noise, or any combination thereof.

Figure 5:
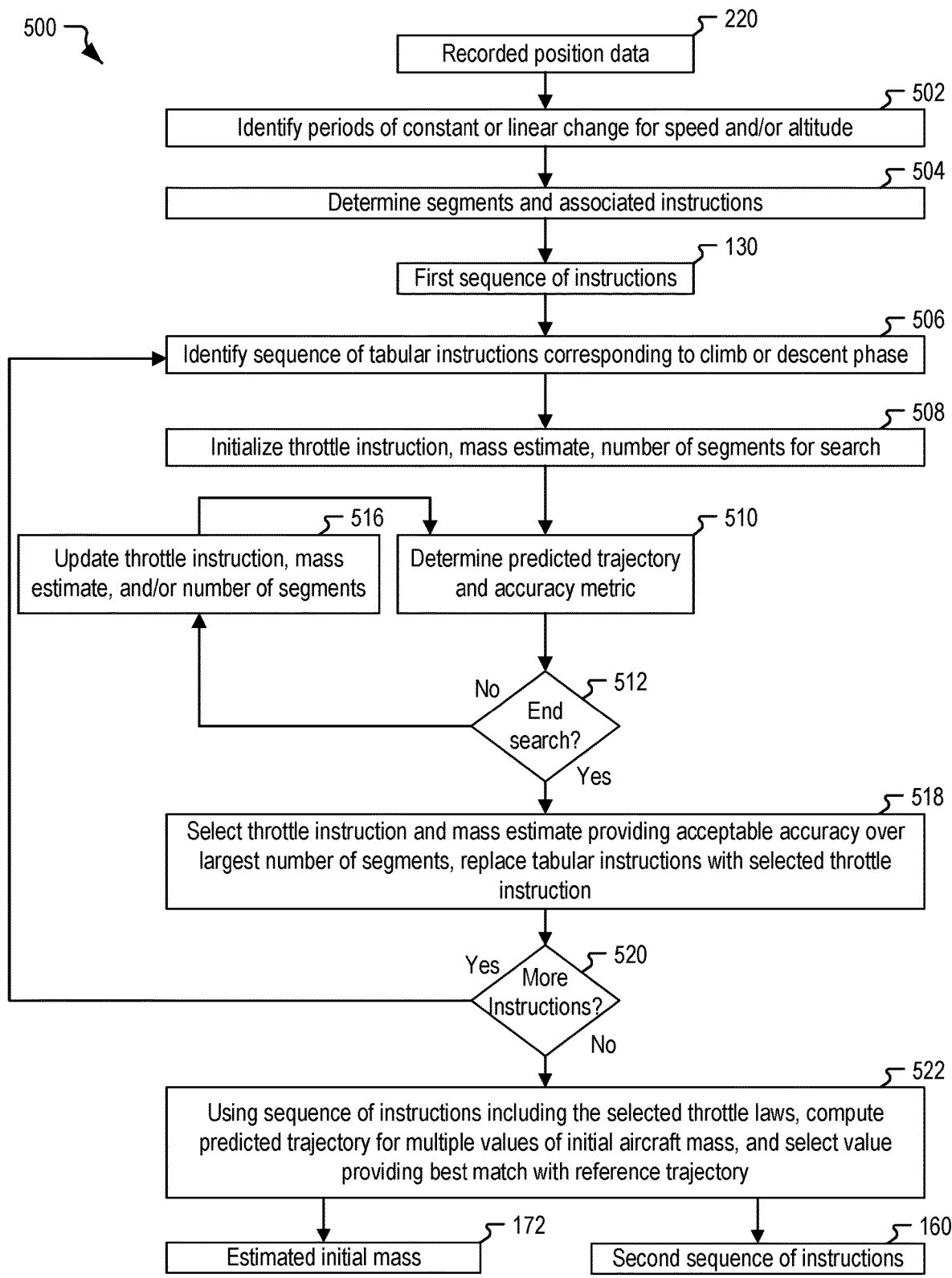
FIG. 5 is a diagram that illustrates a flow chart of a first example of a method that may be performed by any of the systems of FIG. 2-4.

FIG. 5 illustrates a flow chart of a method 500 for generating an estimated initial mass of an aircraft that may be performed using the system 200 of FIG. 2, the system 300 of FIG. 3, or the system 400 of FIG. 4. In a particular example, the method 500 is performed by the aircraft intent generator 202.

The method 500 includes, at block 502, processing the recorded position data 220 (or the real-time position data 352) and identifying periods of constant speed, linear change of speed, constant altitude, linear change of altitude, or combinations thereof. For example, in a particular implementation, the kinematic description generator 204 of FIG. 2 processes the recorded position data 220 to determine one or more measures of speed, such as CAS or mach, a change in the one or more measure of speed, and a change of altitude between individual points of four dimensional data in the recorded position data 220 (e.g., one dimension of time and three spatial dimensions of the position of the aircraft 102). The kinematic description generator 204 may determine lines of best fit for the generated time sequences of speed values, altitude values, changes in speed values, and changes in altitude values to identify whether any of the sequences correspond to periods during the flight of constant altitude, constant speed, linear increase or decrease of speed or altitude, or a combination thereof.

The method 500 includes, at block 504, determining segments of the flight and instructions associated with each of the segments. For example, the kinematic description generator 204 generates segments of the flight, such as the segments 120, based on changes in regimes of aircraft operation including changes in speed, changes in altitude, etc. The kinematic description generator 204 identifies instructions, such as intent instances of the AIDL 232, associated with the respective sequences, to generate the first sequence 130 of instructions.

The method 500 includes, at block 506, identifying a sequence of tabular instructions corresponding to a climb phase or a descent phase of the flight. For example, the operational description generator 206 of FIG. 2 can parse the first sequence 130 of instructions to identify multiple sequential segments associated with different amounts of constant rates of climb, such as the tabular instructions 132 of FIG. 1, corresponding to the climb phase 114. The operational description generator 206 can sequentially search the first sequence 130 of instructions to identify each climb phase, descent phase, or both.

The method 500 includes, at block 508, initializing a throttle instruction, a mass estimate, and a number of segments for a search associated with performing the bounded optimization operation 140. To illustrate, for an identified climb phase, the operational description generator 206 can select an initial value of the throttle instruction as a maximum climb throttle instruction, select an initial value of the mass estimate as a midpoint of the mass upper bound 250 and the mass lower bound 252, and select an initial value of the number of segments as the full number of segments associated with the detected climb phase, as an illustrative, non-limiting example.

The method 500 includes, at block 510, determining a predicted trajectory and accuracy metric associated with the current values of the throttle instruction, the mass estimate, and the number of segments. For example, the trajectory engine 208 of FIG. 2 can determine a predicted trajectory 244 based on the current values of the throttle instruction and the mass estimate as applied over the selected number of segments. The operational description generator 206 can compare the predicted trajectory 244 to the reference trajectory 230 over the selected number of segments to generate accuracy metric, such as based on a root-mean-square computation, as an illustrative, non-limiting example.

The method 500 includes determining whether the search has satisfied a termination criterion, at block 512. For example, the search to find an "optimum" value of the throttle instruction, the mass estimate, and the number of segments may include determining whether the accuracy metric satisfies a threshold criterion, determining whether a number of iterations of the search that have been performed has reached an upper limit, determining that a convergence criterion indicates that further iterations of the search are unlikely to provide an improved accuracy metric, one or more other criteria to terminate the search, or a combination thereof. As used herein, an "optimum" value does not necessarily refer to a theoretically optimum value, and can instead refer to a particular value among multiple trials that results in a best accuracy metric observed for the multiple trials (e.g., in a brute-force search), a value that results in a best attainable accuracy metric in light of constraints such as granularity and noise, or a first value that is encountered during the search that results in an accuracy metric that satisfies a threshold, as non-limiting examples.

In response to determining, at block 512, that the search has not satisfied the termination criterion, the method 500 includes updating one or more of the current throttle instruction, the current mass estimate, or the current number of segments for a next iteration of the search, at block 516, and determining the predicted trajectory and accuracy metric based on the updated values, at block 510. To illustrate, the search may be performed using multiple nested loops, with an outermost loop associated with the throttle instruction, a middle loop associated with the number of segments, and an inner loop associated with the mass estimate. Values of the throttle instruction and the number of segments may be held constant while varying the mass estimate until an optimum value of the mass estimate is determined for the particular values of the throttle instruction and the number of segments. Upon selecting the mass estimate, a next value of the number of segments may be selected for a next iteration of the middle loop, such as by reducing the number of sequential segments by one (e.g., truncating the last segment from the sequence of segments under consideration), and the inner loop may be repeated to select an optimum mass estimate in light of the updated number of sequential segments. After completing the middle loop and determining an optimal combination of a mass estimate and a number of segments for a particular throttle instruction, a next iteration of the outer loop may be performed by selecting a next throttle instruction and repeating performance of the middle loop and the inner loop, as described above.

In response to a decision to terminate the search, at block 512, the throttle instruction and the mass estimate that provide acceptable accuracy (e.g., a root mean square error less than a particular threshold) over the largest number of segments are selected, and the tabular instructions of the first sequence 130 of instructions associated with the climb or descent phase are replaced with the selected throttle instruction in the second sequence 160 of instructions, at block 518. Thus, according to an aspect, the operations associated with blocks 508, 510, 512, 516, and 518 correspond to an instance of the bounded optimization operation 140.

The method 500 includes, at block 520, determining whether the first sequence 130 of instructions includes more instructions to process, such as by determining whether one or more climb phases, descent phases, or both, have not yet been processed by the bounded optimization operation 140. In response to determining that there are more instructions remaining to be processed, at block 520, the method 500 returns to block 506, where a next sequence of tabular instructions corresponding to a next climb phase or descent phase is identified.

Otherwise, when all instructions of the first sequence 130 associated with climb phases and descent phases have been processed, the method 500 includes using the sequence of instructions including the selected throttle law instructions (e.g., the second sequence 160) to compute a predicted trajectory for multiple values of an initial aircraft mass and selecting the value of the initial aircraft mass that provides the best match with the reference trajectory, at block 522. In a particular implementation, the operations associated with block 522 correspond to the second bounded optimization operation 170. Upon determining the particular value of the initial aircraft mass that produces the best match with the reference trajectory, the particular value of the initial aircraft mass is output as the estimated initial mass 172 in conjunction with the second sequence 160 of instructions.

Figure 6:
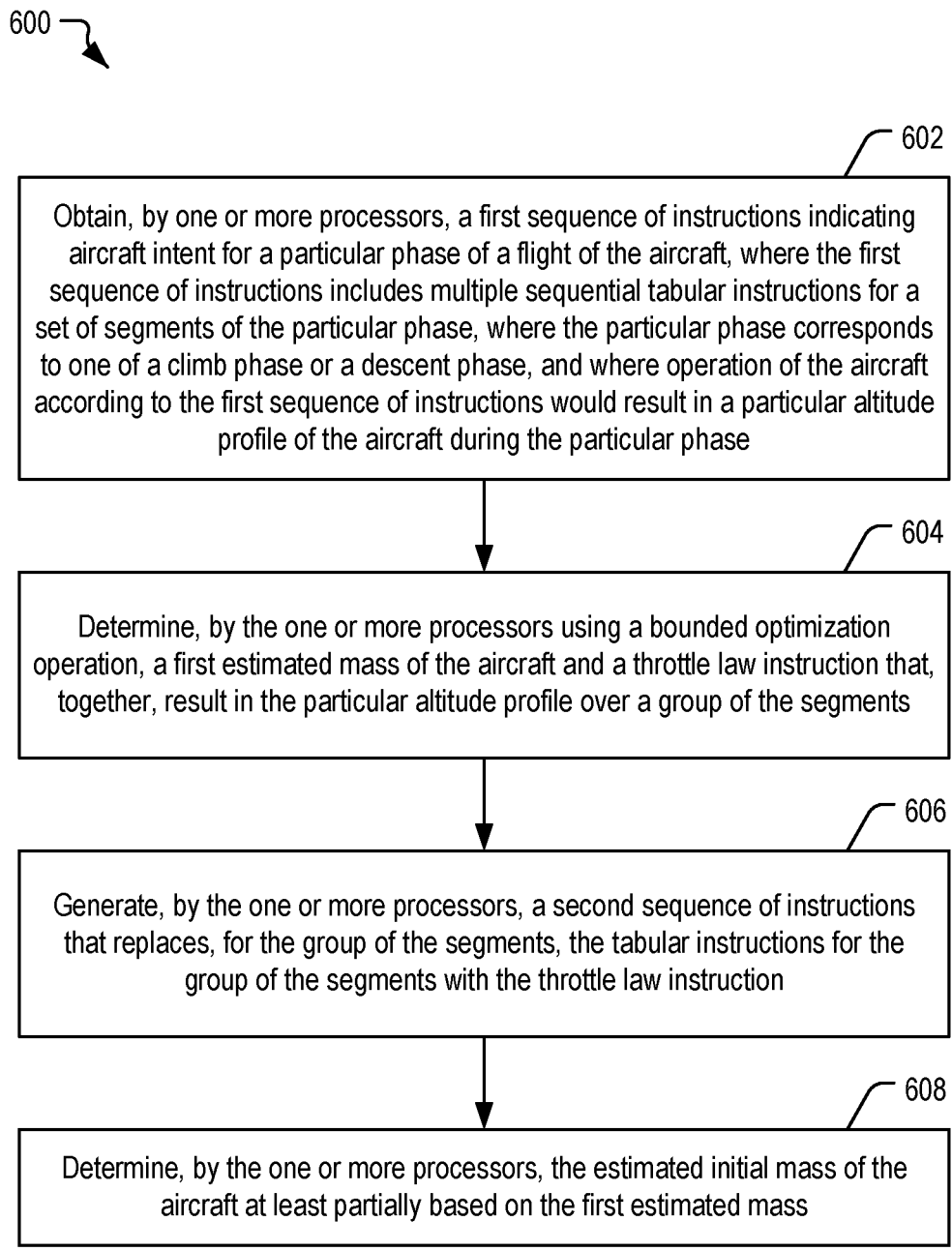
FIG. 6 is a diagram that illustrates a flow chart of a second example of a method that may be performed by any of the systems of FIG. 2-4.

FIG. 6 illustrates a flow chart of a method 600 for generating an estimated initial mass of an aircraft that may be performed by the system 200 of FIG. 2, the system 300 of FIG. 3, or the system 400 of FIG. 4. In a particular example, the method 600 is performed by the aircraft intent generator 202.

The method 600 includes, at block 602, obtaining, by one or more processors, a first sequence of instructions indicating aircraft intent for a particular phase of a flight of the aircraft, where the first sequence of instructions includes multiple sequential tabular instructions for a set of segments of the particular phase, where the particular phase corresponds to one of a climb phase or a descent phase, and where operation of the aircraft according to the first sequence of instructions would result in a particular altitude profile of the aircraft during the particular phase. In an example, the first sequence 130 of instructions is received by the operational description generator 206 and indicates aircraft intent for the climb phase 114. The first sequence 130 includes the tabular instructions 132 for the first set 122 of the segments 120 corresponding to the climb phase 114 such that operation of the aircraft 102 would result in the climb altitude profile 112.

The method 600 includes, at block 604, determining, by the one or more processors using a bounded optimization operation, a first estimated mass of the aircraft and a throttle law instruction that, together, result in the particular altitude profile over a group of the segments. In an example, the operational description generator 206 determines, using the bounded optimization operation 140, the first estimated mass 144 of the aircraft 102 and the throttle law instruction 162 that result in the climb altitude profile 112 over the group 142 of the segments 120.

The method 600 includes, at block 606, generating, by the one or more processors, a second sequence of instructions that replaces, for the group of the segments, the tabular instructions for the group of the segments with the throttle law instruction. In an example, the operational description generator 206 generates the second sequence 160 of instructions that replaces the tabular instructions 132 with the throttle law instruction 162 for the group 142 of the segments 120.

The method 600 includes, at block 608, determining, by the one or more processors, the estimated initial mass of the aircraft at least partially based on the first estimated mass. In an example, the operational description generator 206 determines the estimated initial mass 172, at least partially based on the first estimated mass 144, such as by using the second bounded optimization operation 170.

Figure 7:
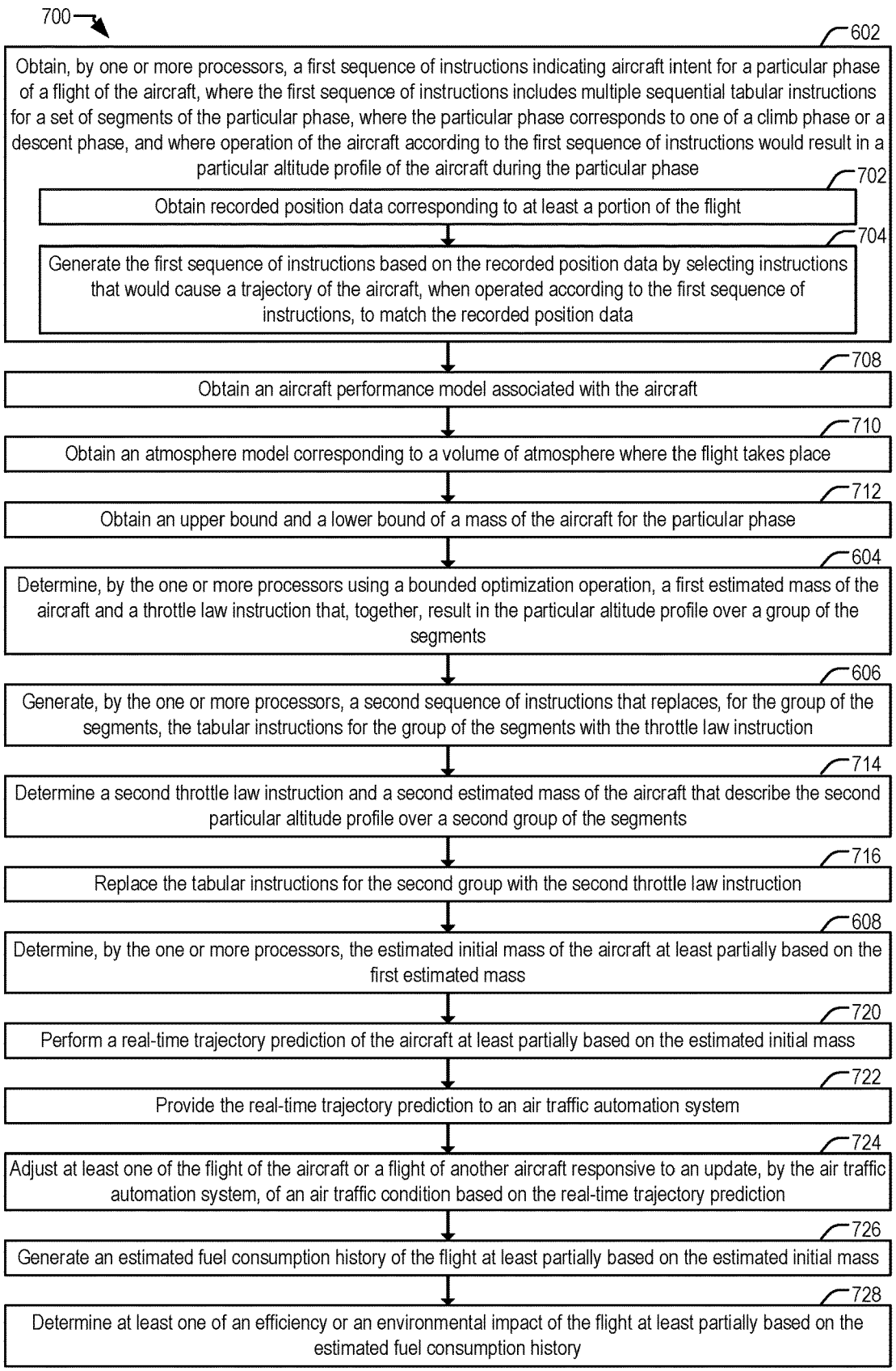
FIG. 7 is a diagram that illustrates a flow chart of a third example of a method that may be performed by any of the systems of FIG. 2-4.

FIG. 7 illustrates a flow chart of a method 700 for generating an estimated initial mass of an aircraft that may be performed by the system 200 of FIG. 2, the system 300 of FIG. 3, the system 400 of FIG. 4, or a combination thereof. The method 700 incorporates elements previously described in FIG. 6.

The method 700 includes, at block 602, obtaining, by one or more processors, a first sequence of instructions indicating aircraft intent for a particular phase of a flight of the aircraft, where the first sequence of instructions includes multiple sequential tabular instructions for a set of segments of the particular phase, where the particular phase corresponds to one of a climb phase or a descent phase, and where operation of the aircraft according to the first sequence of instructions would result in a particular altitude profile of the aircraft during the particular phase. In an example, the first sequence of instructions is the first sequence 130 that is received by the operational description generator 206 and that indicates aircraft intent for the climb phase 114. The first sequence 130 includes the tabular instructions 132 for the first set 122 of the segments 120 corresponding to the climb phase 114 such that operation of the aircraft 102 would result in the climb altitude profile 112.

In a particular implementation, obtaining the first sequence of instructions includes obtaining, at block 702, recorded position data corresponding to at least a portion of the flight and generating, at block 704, the first sequence of instructions based on the recorded position data by selecting instructions that would cause a trajectory of the aircraft, when operated according to the first sequence of instructions, to match the recorded position data. For example, the kinematic description generator 204 processes the position data 220 to generate the first sequence 130 of instructions.

According to an aspect, the method 700 includes, at block 708, obtaining an aircraft performance model associated with the aircraft, such as the aircraft performance model 224. The method 700 includes, at block 710, obtaining an atmosphere model corresponding to a volume of atmosphere where the flight takes place, such as the atmosphere model 226.

According to an aspect, the method 700 includes, at block 712, obtaining an upper bound and a lower bound of a mass of the aircraft for the particular phase. As an example, the operational description generator 206 can obtain the mass upper bound 250 and the mass lower bound 252 based on the initial data 222 or the aircraft performance model 224 from the memory 210, such as based on maximum take-off weight and operating empty weight for the aircraft 102, as described with reference to FIG. 2, and use the mass upper bound 250 and the mass lower bound 252 as constraints during the bounded optimization operation 140.

The method 700 includes, at block 604, determining, by the one or more processors using a bounded optimization operation, a first estimated mass of the aircraft and a throttle law instruction that, together, result in the particular altitude profile over a group of the segments. In an example, the operational description generator 206 determines, using the bounded optimization operation 140A, the first estimated mass 144 of the aircraft 102 and the throttle law instruction 162 that result in the climb altitude profile 112 over the group 142 of the segments 120. According to an aspect, the bounded optimization operation is at least partially based on the aircraft performance model and the atmosphere model. For example, the trajectory engine 208 uses the aircraft performance model 224 and the atmosphere model 226 when generating the trajectory 244.

The method 700 includes, at block 606, generating, by the one or more processors, a second sequence of instructions that replaces, for the group of the segments, the tabular instructions for the group of the segments with the throttle law instruction. In an example, the operational description generator 206 generates the second sequence 160 of instructions that replaces the tabular instructions 132 with the throttle law instruction 162 for the group 142 of the segments 120. In a particular example, the instructions correspond to intent instances of an aircraft intent description language, such as the AIDL 232.

According to an aspect, the first sequence of instructions further includes, for a second particular phase of the flight that corresponds to the other one of the climb phase or the descent phase, multiple sequential tabular instructions for a second set of the segments of the second particular phase, and operation of the aircraft according to the first sequence of instructions would result in a second particular altitude profile of the aircraft during the second particular phase. To illustrate, the first sequence 130 includes the tabular instructions 134 for the second set 124 of the segments 120. The tabular instructions 134 correspond to the descent phase 118 such that operation of the aircraft 102 according to the tabular instructions 134 would result in the descent altitude profile 116.

According to an aspect, the method 700 includes, at block 714, determining a second throttle law instruction and a second estimated mass of the aircraft that describe the second particular altitude profile over a second group of the segments. For example, the operational description generator 206 determines the second throttle law instruction 164 and the second estimated mass 154 based on the bounded optimization operation 140B. The method 700 includes, at block 716, replacing the tabular instructions for the second group with the second throttle law instruction, such as the operational description generator 206 replacing, in the second sequence 160 of instructions, the $ROC_4$ and $ROC5$ instructions from the first sequence 130 of instructions with the second throttle law instruction 164.

The method 700 includes, at block 608, determining, by the one or more processors, the estimated initial mass of the aircraft at least partially based on the first estimated mass. In an example, the estimated initial mass is determined based on a second bounded optimization operation that uses the second sequence of instructions, including the throttle law instruction and the second throttle law instruction, to determine a value of the estimated initial mass that results in a predicted trajectory that most closely matches a reference trajectory of the flight. For example, the operational description generator 206 performs the second bounded optimization operation 170 to determine the estimated initial mass 172 based on the first estimated mass 144 and the second estimated mass 154 and using the second sequence 160 of instructions including the throttle law instruction 162 and the second throttle law instruction 164.

According to an aspect, the method 700 includes, at block 720, performing a real-time trajectory prediction of the aircraft at least partially based on the estimated initial mass. The method 700 includes, at block 722, providing the real-time trajectory prediction to an air traffic automation system. To illustrate, the trajectory engine 308 of FIG. 3 uses the second sequence 160 of instructions and the estimated initial mass 172 to generate the real-time trajectory prediction 312, which is provided to the air traffic automation system 302 of FIG. 3. The method 700 includes, at block 724, adjusting at least one of the flight of the aircraft or a flight of another aircraft responsive to an update, by the air traffic automation system, of an air traffic condition based on the real-time trajectory prediction. To illustrate, the air traffic automation system 302 adjusts at least one of the flight of the aircraft 102 or the aircraft 332 responsive to an update of the air traffic condition 310 based on the real-time trajectory prediction 312 affecting the predicted flight trajectory 328 of the aircraft 102.

According to an aspect, the method 700 includes, at block 726, generating an estimated fuel consumption history of the flight at least partially based on the estimated initial mass. The method 700 includes, at block 728, determining at least one of an efficiency or an environmental impact of the flight at least partially based on the estimated fuel consumption history. In a particular example, the analysis engine 402 of FIG. 4 generates the fuel consumption history 410 at least partially based on the estimated initial mass 172 and determines the efficiency 412, the environmental impact 414, the noise generation 416, or any combination thereof, at least partially based on the fuel consumption history 410.

Figure 8:
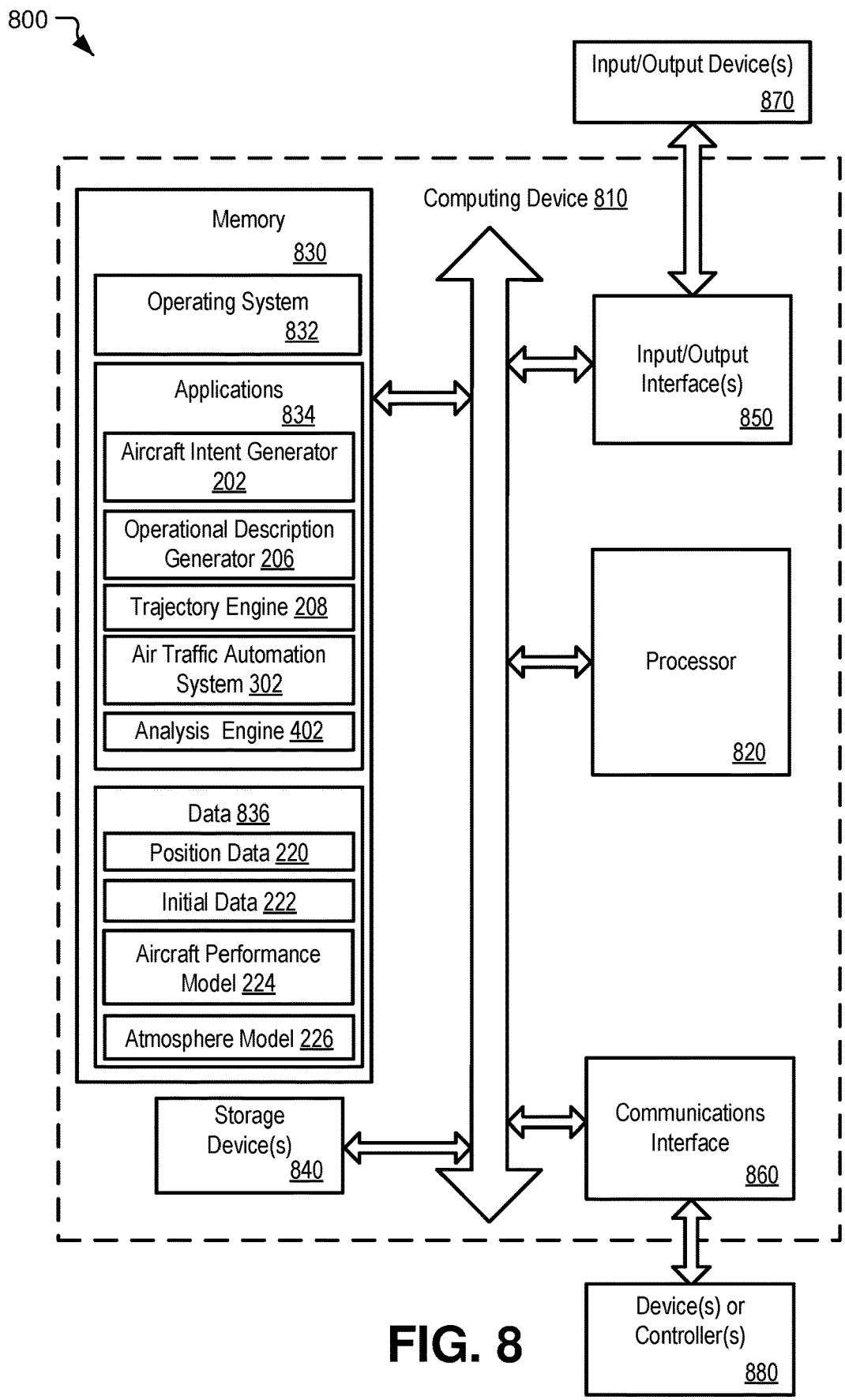
FIG. 8 is a block diagram of a computing environment including a computing device configured to support aspects of computer-implemented methods and computer-executable program instructions according to the present disclosure.

FIG. 8 is a block diagram of a computing environment 800 including a computing device 810 configured to support aspects of computer-implemented methods and computer-executable program instructions according to the present disclosure. For example, the computing device 810, or portions thereof, is configured to execute instructions to initiate, perform, or control one or more operations described with reference to FIGS. 1-7. In some implementations, the computing device 810 includes components configured to generate an estimated initial mass of an aircraft.

The computing device 810 includes one or more processors 820. The processor(s) 820 are configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. In a particular implementation, the system memory 830 corresponds to the memory 210 of FIG. 2. The system memory 830 stores an operating system 832, which may include a basic input/output system for booting the computing device 810 as well as a full operating system to enable the computing device 810 to interact with users, other programs, and other devices. The system memory 830 stores data 836, such as the position data 220, the initial data 222, the aircraft performance model 224, and the atmosphere model 226.

The system memory 830 includes one or more applications 834 executable by the processor(s) 820. As an example, the one or more applications 834 include instructions executable by the processor(s) 820 to initiate, control, or perform one or more operations described with reference to FIGS. 1-7. To illustrate, the one or more applications 834 include instructions executable by the processor(s) 820 to initiate, control, or perform one or more operations described with reference to the aircraft intent generator 202, the kinematic description generator 204, the operational description generator 206, the trajectory engine 208, the trajectory engine 308, the air traffic automation system 302, the analysis engine 402, or a combination thereof.

In a particular implementation, the system memory 830 includes a non-transitory, computer-readable medium storing instructions that, when executed by the processor(s) 820, cause the processor(s) 820 to initiate, perform, or control operations for generating an estimated initial mass of an aircraft. The operations include obtaining a first sequence of instructions indicating aircraft intent for a particular phase of a flight of the aircraft. The first sequence of instructions includes multiple sequential tabular instructions for a set of segments of the particular phase, the particular phase corresponds to one of a climb phase or a descent phase, and operation of the aircraft according to the first sequence of instructions would result in a particular altitude profile of the aircraft during the particular phase. The operations include determining, using a bounded optimization operation, a first estimated mass of the aircraft and a throttle law instruction that, together, result in the particular altitude profile over a group of the segments. The operations include generating a second sequence of instructions that replaces, for the group of the segments, the tabular instructions for the group of the segments with the throttle law instruction. The operations also include determining the estimated initial mass of the aircraft at least partially based on the first estimated mass.

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications, and program data. In a particular aspect, the system memory 830, the storage devices 840, or both, include tangible computer-readable media. In a particular aspect, one or more of the storage devices 840 are external to the computing device 810. In a particular implementation, the one or more storage devices 840 correspond to the memory 210 of FIG. 2.

The one or more input/output interfaces 850 enable the computing device 810 to communicate with one or more input/output devices 870 to facilitate user interaction. For example, the input/output devices 870 can include one or more displays, input devices (e.g., keyboards, pointing devices, touchscreens, or speech interface devices), one or more other input/output devices, or a combination thereof. The one or more input/output interfaces 850 can include a display interface, an input interface, one or more other interfaces, or a combination thereof. The processor(s) 820 are configured to communicate with devices or controllers 880 via the one or more communications interfaces 860. For example, the one or more communications interfaces 860 can include a network interface. The devices or controllers 880 can include, for example, an aircraft detection system (e.g., radar) or an ADS-B receiver to provide the position data 220 or the real-time position data 352 of one or more aircraft, a weather or other environmental tracking or prediction system to provide the atmosphere model 226, one or more other devices, or any combination thereof.

In conjunction with the described systems and methods, an apparatus for generating an estimated initial mass of an aircraft is disclosed that includes means for obtaining a first sequence of instructions indicating aircraft intent for a particular phase of a flight of the aircraft, where the first sequence of instructions includes multiple sequential tabular instructions for a set of segments of the particular phase, where the particular phase corresponds to one of a climb phase or a descent phase, and where operation of the aircraft according to the first sequence of instructions would result in a particular altitude profile of the aircraft during the particular phase. In some implementations, the means for obtaining the first sequence of instructions corresponds to the aircraft intent generator 202, the operational description generator 206, the processor 820, the computing device 810, one or more other circuits or devices configured to obtain a first sequence of instructions indicating aircraft intent for a particular phase of a flight of the aircraft, or a combination thereof.

The apparatus includes means for determining, using a bounded optimization operation, a first estimated mass of the aircraft and a throttle law instruction that, together, result in the particular altitude profile over a group of the segments. In some implementations, the means for determining the first estimated mass and the throttle law instruction corresponds to the aircraft intent generator 202, the operational description generator 206, the processor 820, the computing device 810, one or more other circuits or devices configured to determine, using a bounded optimization operation, a first estimated mass of the aircraft and a throttle law instruction, or a combination thereof.

The apparatus includes means for generating a second sequence of instructions that replaces, for the group of the segments, the tabular instructions for the group of the segments with the throttle law instruction. In some implementations, the means for generating the second sequence of instructions corresponds to the aircraft intent generator 202, the operational description generator 206, the processor 820, the computing device 810, one or more other circuits or devices configured to generate the second sequence of instructions, or a combination thereof.

The apparatus includes means for determining the estimated initial mass of the aircraft at least partially based on the first estimated mass. In some implementations, the means for determining the estimated initial mass corresponds to the aircraft intent generator 202, the operational description generator 206, the processor 820, the computing device 810, one or more other circuits or devices configured to determine the estimated initial mass of the aircraft at least partially based on the first estimated mass, or a combination thereof.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-7. To illustrate, the instructions of the applications 834, when executed by the processor(s) 820, can cause the processor(s) 820 to initiate, perform, or control operations for generating an estimated initial mass of an aircraft. The operations include obtaining a first sequence of instructions indicating aircraft intent for a particular phase of a flight of the aircraft. The first sequence of instructions includes multiple sequential tabular instructions for a set of segments of the particular phase, the particular phase corresponds to one of a climb phase or a descent phase, and operation of the aircraft according to the first sequence of instructions would result in a particular altitude profile of the aircraft during the particular phase. The operations include determining, using a bounded optimization operation, a first estimated mass of the aircraft and a throttle law instruction that, together, result in the particular altitude profile over a group of the segments. The operations include generating a second sequence of instructions that replaces, for the group of the segments, the tabular instructions for the group of the segments with the throttle law instruction. The operations also include determining the estimated initial mass of the aircraft at least partially based on the first estimated mass. In some implementations, part or all of one or more of the operations or methods of FIGS. 1-7 may be implemented by one or more processors (e.g., one or more central processing units, one or more graphics processing units, or one or more digital signal processors) executing instructions, by dedicated hardware circuitry, or any combination thereof.

Further, the disclosure comprises embodiments according to the following examples:

Example 1. A method of generating an estimated initial mass of an aircraft, including: obtaining, by one or more processors, a first sequence of instructions indicating aircraft intent for a particular phase of a flight of the aircraft, wherein the first sequence of instructions includes multiple sequential tabular instructions for a set of segments of the particular phase, wherein the particular phase corresponds to one of a climb phase or a descent phase, and wherein operation of the aircraft according to the first sequence of instructions would result in a particular altitude profile of the aircraft during the particular phase; determining, by the one or more processors using a bounded optimization operation, a first estimated mass of the aircraft and a throttle law instruction that, together, result in the particular altitude profile over a group of the segments; generating, by the one or more processors, a second sequence of instructions that replaces, for the group of the segments, the tabular instructions for the group of the segments with the throttle law instruction; and determining, by the one or more processors, the estimated initial mass of the aircraft at least partially based on the first estimated mass.

Example 2. The method of Example 1, further including: obtaining an aircraft performance model associated with the aircraft; and obtaining an atmosphere model corresponding to a volume of atmosphere where the flight takes place, wherein the bounded optimization operation is at least partially based on the aircraft performance model and the atmosphere model.

Example 3. The method of Example 2, further including: performing a real-time trajectory prediction of the aircraft at least partially based on the estimated initial mass; providing the real-time trajectory prediction to an air traffic automation system; and adjusting at least one of the flight of the aircraft or a flight of another aircraft responsive to an update, by the air traffic automation system, of an air traffic condition based on the real-time trajectory prediction.

Example 4. The method of Example 2 or Example 3, further including generating an estimated fuel consumption history of the flight at least partially based on the estimated initial mass.

Example 5. The method of Example 4, further including determining at least one of an efficiency or an environmental impact of the flight at least partially based on the estimated fuel consumption history.

Example 6. The method of any of Example 1 to Example 5, wherein the first sequence of instructions further includes, for a second particular phase of the flight that corresponds to the other one of the climb phase or the descent phase, multiple sequential tabular instructions for a second set of the segments of the second particular phase, and wherein operation of the aircraft according to the first sequence of instructions would result in a second particular altitude profile of the aircraft during the second particular phase.

Example 7. The method of Example 6, further including: determining a second throttle law instruction and a second estimated mass of the aircraft that describe the second particular altitude profile over a second group of the segments; and replacing the tabular instructions for the second group with the second throttle law instruction, wherein the estimated initial mass is determined based on a second bounded optimization operation that uses the second sequence of instructions, including the throttle law instruction and the second throttle law instruction, to determine a value of the estimated initial mass that results in a predicted trajectory that most closely matches a reference trajectory of the flight.

Example 8. The method of any of Example 1 to Example 7, further including obtaining an upper bound and a lower bound of a mass of the aircraft for the particular phase, and wherein the upper bound and the lower bound are used as constraints by the bounded optimization operation.

Example 9. The method of any of Example 1 to Example 8, wherein obtaining the first sequence of instructions includes: obtaining recorded position data corresponding to at least a portion of the flight; and generating the first sequence of instructions based on the recorded position data by selecting instructions that would cause a trajectory of the aircraft, when operated according to the first sequence of instructions, to match the recorded position data.

Example 10. The method of any of Example 1 to Example 9, wherein the instructions correspond to intent instances of an aircraft intent description language (AIDL).

Example 11. A device including: a memory configured to store instructions; and a processor configured to execute the instructions to perform the method of any of Example 1 to Example 10.

Example 12. A non-transitory, computer-readable medium storing instructions that, when executed by a processor, cause the processor to perform the method of any of Example 1 to Example 10.

Example 13. An apparatus including means for carrying out the method of any of Example 1 to Example 10.

Example 14. A system for generating an estimated initial mass of an aircraft, including: a memory configured to store data associated with a flight of the aircraft; one or more processors configured to: obtain a first sequence of instructions indicating aircraft intent for a particular phase of the flight, wherein the first sequence of instructions includes multiple sequential tabular instructions for a set of segments of the particular phase, wherein the particular phase corresponds to one of a climb phase or a descent phase, and wherein operation of the aircraft according to the first sequence of instructions would result in a particular altitude profile of the aircraft during the particular phase; determine, using a bounded optimization operation, a first estimated mass of the aircraft and a throttle law instruction that, together, result in the particular altitude profile over a group of the segments; generate a second sequence of instructions that replaces, for the group of the segments, the tabular instructions for the group of the segments with the throttle law instruction; and determine the estimated initial mass of the aircraft at least partially based on the first estimated mass.

Example 15. The system of Example 14, wherein the data includes recorded position data corresponding to at least a portion of the flight, and wherein the one or more processors are further configured to generate the first sequence of instructions based on the recorded position data by selecting instructions that would cause a trajectory of the aircraft, when operated according to the first sequence of instructions, to match the recorded position data.

Example 16. The system of Example 14 or Example 15, wherein the data includes an aircraft performance model associated with the aircraft and an atmosphere model corresponding to a volume of atmosphere where the flight takes place, and wherein the bounded optimization operation is at least partially based on the aircraft performance model and the atmosphere model.

Example 17. The system of any of Example 14 to Example 16, wherein the one or more processors are further configured to: perform a real-time trajectory prediction of the aircraft at least partially based on the estimated initial mass; provide the real-time trajectory prediction to an air traffic automation system; and adjust at least one of the flight of the aircraft or a flight of another aircraft responsive to an update, by the air traffic automation system, of an air traffic condition based on the real-time trajectory prediction.

Example 18. The system of any of Example 14 to Example 17, wherein the one or more processors are further configured to generate an estimated fuel consumption history of the flight at least partially based on the estimated initial mass.

Example 19. A non-transitory, computer-readable medium storing instructions that, when executed by a processor, cause the processor to initiate, perform, or control operations for generating an estimated initial mass of an aircraft, the operations including: obtaining a first sequence of instructions indicating aircraft intent for a particular phase of a flight of the aircraft, wherein the first sequence of instructions includes multiple sequential tabular instructions for a set of segments of the particular phase, wherein the particular phase corresponds to one of a climb phase or a descent phase, and wherein operation of the aircraft according to the first sequence of instructions would result in a particular altitude profile of the aircraft during the particular phase; determining, using a bounded optimization operation, a first estimated mass of the aircraft and a throttle law instruction that, together, result in the particular altitude profile over a group of the segments; generating a second sequence of instructions that replaces, for the group of the segments, the tabular instructions for the group of the segments with the throttle law instruction; and determining the estimated initial mass of the aircraft at least partially based on the first estimated mass.

Example 20. The non-transitory, computer-readable medium of Example 19, wherein the operations further include: obtaining an aircraft performance model associated with the aircraft; and obtaining an atmosphere model corresponding to a volume of atmosphere where the flight takes place, wherein the bounded optimization operation is at least partially based on the aircraft performance model and the atmosphere model.

Example 21. The non-transitory, computer-readable medium of Example 19 or Example 20, wherein the operations further include: performing a real-time trajectory prediction of the aircraft at least partially based on the estimated initial mass; providing the real-time trajectory prediction to an air traffic automation system; and adjusting at least one of the flight of the aircraft or a flight of another aircraft responsive to an update, by the air traffic automation system, of an air traffic condition based on the real-time trajectory prediction.

Example 22. The non-transitory, computer-readable medium of any of Example 19 to Example 21, wherein the operations further include generating an estimated fuel consumption history of the flight at least partially based on the estimated initial mass.

Example 23. The non-transitory, computer-readable medium of Example 22, wherein the operations further include determining at least one of an efficiency or an environmental impact of the flight at least partially based on the estimated fuel consumption history. The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of generating an estimated initial mass of an aircraft, comprising:
obtaining, by one or more processors, a first sequence of instructions indicating aircraft intent for a particular phase of a flight of the aircraft, wherein the first sequence of instructions includes multiple sequential tabular instructions for a set of segments of the particular phase, wherein the particular phase corresponds to one of a climb phase or a descent phase, and wherein operation of the aircraft according to the first sequence of instructions would result in a particular altitude profile of the aircraft during the particular phase;

determining, by the one or more processors using a bounded optimization operation, a first estimated mass of the aircraft and a throttle law instruction that, together, result in the particular altitude profile over a group of the segments;

generating, by the one or more processors, a second sequence of instructions that replaces, for the group of the segments, the tabular instructions for the group of the segments with the throttle law instruction, wherein the replacing occurs during both the climb phase and the descent phase of the flight; and determining, by the one or more processors, the estimated initial mass of the aircraft at least partially based on the first estimated mass.

2. The method of claim 1, further comprising:
obtaining an aircraft performance model associated with the aircraft; and
obtaining an atmosphere model corresponding to a volume of atmosphere where the flight takes place,
wherein the bounded optimization operation is at least partially based on the aircraft performance model and the atmosphere model.

3. The method of claim 2, further comprising:
performing a real-time trajectory prediction of the aircraft at least partially based on the estimated initial mass;
providing the real-time trajectory prediction to an air traffic automation system; and
adjusting at least one of the flight of the aircraft or a flight of another aircraft responsive to an update, by the air traffic automation system, of an air traffic condition based on the real-time trajectory prediction.

4. The method of claim 2, further comprising generating an estimated fuel consumption history of the flight at least partially based on the estimated initial mass.

5. The method of claim 4, further comprising determining at least one of an efficiency or an environmental impact of the flight at least partially based on the estimated fuel consumption history.

6. The method of claim 1, wherein the particular phase corresponds to the climb phase, wherein the first sequence of instructions further includes multiple sequential tabular instructions for segments corresponding to the descent phase, and wherein operation of the aircraft according to the first sequence of instructions would result in a climb phase altitude profile and a descent phase altitude profile.

7. The method of claim 6, further comprising:
determining a second throttle law instruction and a second estimated mass of the aircraft that describe the descent phase altitude profile over a second group of the segments; and
replacing the tabular instructions for the second group with the second throttle law instruction,
wherein the estimated initial mass is determined based on a second bounded optimization operation that uses the second sequence of instructions, including the throttle law instruction and the second throttle law instruction, to determine a value of the estimated initial mass that results in a predicted trajectory that most closely matches a reference trajectory of the flight.

8. The method of claim 1, further comprising obtaining an upper bound and a lower bound of a mass of the aircraft for the particular phase, and wherein the upper bound and the lower bound are used as constraints by the bounded optimization operation.

9. The method of claim 1, wherein obtaining the first sequence of instructions comprises:

obtaining recorded position data corresponding to at least a portion of the flight; and
generating the first sequence of instructions based on the recorded position data by selecting instructions that would cause a trajectory of the aircraft, when operated according to the first sequence of instructions, to match the recorded position data.

10. The method of claim 1, wherein the instructions correspond to intent instances of an aircraft intent description language (AIDL).

11. A system for generating an estimated initial mass of an aircraft, comprising:
a memory configured to store data associated with a flight of the aircraft;
one or more processors configured to:
obtain a first sequence of instructions indicating aircraft intent for a particular phase of the flight, wherein the first sequence of instructions includes multiple sequential tabular instructions for a set of segments of the particular phase, wherein the particular phase corresponds to one of a climb phase or a descent phase, and wherein operation of the aircraft according to the first sequence of instructions would result in a particular altitude profile of the aircraft during the particular phase;
determine, using a bounded optimization operation, a first estimated mass of the aircraft and a throttle law instruction that, together, result in the particular altitude profile over a group of the segments;
generate a second sequence of instructions that replaces, for the group of the segments, the tabular instructions for the group of the segments with the throttle law instruction, wherein the replacing occurs during both the climb phase and the descent phase of the flight; and
determine the estimated initial mass of the aircraft at least partially based on the first estimated mass.

12. The system of claim 11, wherein the data includes recorded position data corresponding to at least a portion of the flight, and wherein the one or more processors are further configured to generate the first sequence of instructions based on the recorded position data by selecting instructions that would cause a trajectory of the aircraft, when operated according to the first sequence of instructions, to match the recorded position data.

13. The system of claim 11, wherein the data includes an aircraft performance model associated with the aircraft and an atmosphere model corresponding to a volume of atmosphere where the flight takes place, and wherein the bounded optimization operation is at least partially based on the aircraft performance model and the atmosphere model.

14. The system of claim 11, wherein the one or more processors are further configured to:
perform a real-time trajectory prediction of the aircraft at least partially based on the estimated initial mass;
provide the real-time trajectory prediction to an air traffic automation system; and
adjust at least one of the flight of the aircraft or a flight of another aircraft responsive to an update, by the air traffic automation system, of an air traffic condition based on the real-time trajectory prediction.

15. The system of claim 11, wherein the one or more processors are further configured to generate an estimated fuel consumption history of the flight at least partially based on the estimated initial mass.

16. A non-transitory, computer-readable medium storing instructions that, when executed by a processor, cause the processor to initiate, perform, or control operations for generating an estimated initial mass of an aircraft, the operations comprising:

obtaining a first sequence of instructions indicating aircraft intent for a particular phase of a flight of the aircraft, wherein the first sequence of instructions includes multiple sequential tabular instructions for a set of segments of the particular phase, wherein the particular phase corresponds to one of a climb phase or a descent phase, and wherein operation of the aircraft according to the first sequence of instructions would result in a particular altitude profile of the aircraft during the particular phase;

determining, using a bounded optimization operation, a first estimated mass of the aircraft and a throttle law instruction that, together, result in the particular altitude profile over a group of the segments;

generating a second sequence of instructions that replaces, for the group of the segments, the tabular instructions for the group of the segments with the throttle law instruction, wherein the replacing occurs during both the climb phase and the descent phase of the flight; and determining the estimated initial mass of the aircraft at least partially based on the first estimated mass.

17. The non-transitory, computer-readable medium of claim 16, wherein the operations further include:

obtaining an aircraft performance model associated with the aircraft; and obtaining an atmosphere model corresponding to a volume of atmosphere where the flight takes place, wherein the bounded optimization operation is at least partially based on the aircraft performance model and the atmosphere model.

18. The non-transitory, computer-readable medium of claim 16, wherein the operations further include:

performing a real-time trajectory prediction of the aircraft at least partially based on the estimated initial mass;

providing the real-time trajectory prediction to an air traffic automation system; and adjusting at least one of the flight of the aircraft or a flight of another aircraft responsive to an update, by the air traffic automation system, of an air traffic condition based on the real-time trajectory prediction.

19. The non-transitory, computer-readable medium of claim 16, wherein the operations further include generating an estimated fuel consumption history of the flight at least partially based on the estimated initial mass.

20. The non-transitory, computer-readable medium of claim 19, wherein the operations further include determining at least one of an efficiency or an environmental impact of the flight at least partially based on the estimated fuel consumption history.

* * * * *